United States Patent
Tao

(10) Patent No.: US 12,184,829 B2
(45) Date of Patent: Dec. 31, 2024

(54) HEAD-MOUNTED DISPLAY DEVICE, TRACKING DEVICE, AND DATA ALIGNING METHOD

(71) Applicant: HTC Corporation, Taoyuan (TW)

(72) Inventor: Sheng-Hui Tao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 165 days.

(21) Appl. No.: 18/047,643

(22) Filed: Oct. 18, 2022

(65) Prior Publication Data

US 2023/0217005 A1 Jul. 6, 2023

Related U.S. Application Data

(60) Provisional application No. 63/266,517, filed on Jan. 6, 2022.

(51) Int. Cl.
*H04N 13/366* (2018.01)
*G06F 3/01* (2006.01)
*H04N 13/271* (2018.01)

(52) U.S. Cl.
CPC ........... *H04N 13/366* (2018.05); *G06F 3/011* (2013.01); *H04N 13/271* (2018.05)

(58) Field of Classification Search
CPC ...... G06F 3/0346; G06F 3/011; G06F 3/0304; H04N 13/271; H04N 13/366
See application file for complete search history.

(56) References Cited

U.S. PATENT DOCUMENTS

| | | | |
|---|---|---|---|
| 9,256,987 B2* | 2/2016 | Ackerman | G02B 27/017 |
| 10,409,364 B2* | 9/2019 | Mikhailov | G06T 7/251 |
| 11,303,875 B2* | 4/2022 | Malaika | H04N 13/128 |
| 11,568,604 B2* | 1/2023 | Stafford | G06F 3/04842 |
| 12,033,355 B2* | 7/2024 | Gunkel | H04N 17/002 |
| 2017/0244811 A1* | 8/2017 | Mckenzie | G02B 27/017 |
| 2019/0385370 A1* | 12/2019 | Boyapalle | G06F 3/012 |
| 2024/0303932 A1* | 9/2024 | Noris | G06T 19/00 |

* cited by examiner

*Primary Examiner* — Tsion B Owens
(74) *Attorney, Agent, or Firm* — CKC & Partners Co., LLC

(57) ABSTRACT

An HMD (head-mounted display) device is disclosed. The HMD device is communicatively connected to a tracking device. The HMD device includes a host memory and a host processor. The host memory is configured to store a host map. The host processor is configured to obtain a client capability data from the tracking device, to generate a partial map from the host map according to the client capability data, and to send the partial map to the tracking device.

20 Claims, 5 Drawing Sheets

HEAD-MOUNTED DISPLAY DEVICE, TRACKING DEVICE, AND DATA ALIGNING METHOD

CROSS-REFERENCE TO RELATED APPLICATION

This application claims priority to U.S. Provisional Application Ser. No. 63/266,517, filed Jan. 6, 2022, which is herein incorporated by reference.

FIELD OF INVENTION

The present application relates to a head-mounted display device, a tracking device, and a data aligning method. More particularly, the present application relates to a head-mounted display device, a tracking device, and a data aligning method of a virtual reality system.

BACKGROUND

During an initial stage of a virtual reality system, in order to align the client coordinate system of the tracking device to the host coordinate system of the HMD device, the tracking device has to load the host map stored in the HMD device from the HMD device. However, the longer the virtual reality system is used, the larger the size of the host map becomes. It might take a long time to load the host map from the HMD device to the tracking device, and the user might obtain a poor user experience.

SUMMARY

The disclosure provides an HMD (head-mounted display) device is disclosed. The HMD device is communicatively connected to a tracking device. The HMD device includes a host memory and a host processor. The host memory is configured to store a host map. The host processor is configured to obtain a client capability data from the tracking device, to generate a partial map from the host map according to the client capability data, and to send the partial map to the tracking device.

The disclosure provides a tracking device. The tracking device is communicatively connected to an HMD device. The tracking device includes a client processor and a client memory. The client processor is configured to send a client capability data to the HMD device, and to receive a partial map generated according to the client capability data. The client memory is configured to store the partial map.

The disclosure provides a data aligning method. The data aligning method is suitable for a virtual reality system including an HMD device and a tracking device. The data aligning method includes the following operations: sending a client capability data to the HMD device by the tracking device; generating a partial map from the host map stored in the HMD device according to the client capability data by the HMD device; and sending the partial map to the tracking device by the HMD device.

It is to be understood that both the foregoing general description and the following detailed description are by examples and are intended to provide further explanation of the invention as claimed.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
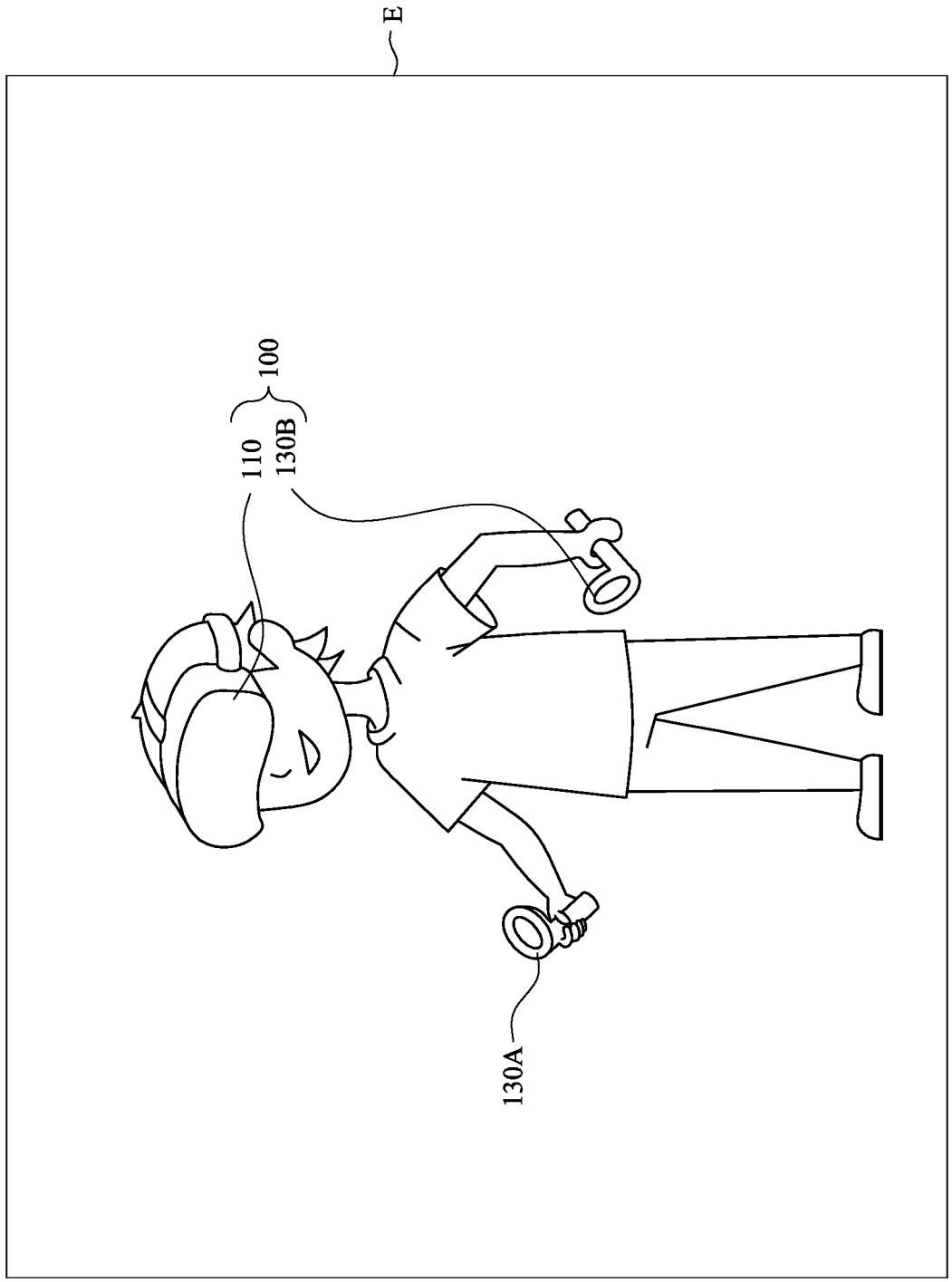
FIG. 1 is a schematic diagram illustrating a virtual reality (VR) system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating a virtual reality (VR) system 100 according to some embodiments of the present disclosure.

As shown in FIG. 1, the virtual reality system 100 includes a head-mounted display (HMD) device 110 and tracking devices 130A and 130B. The HMD device 110 can be disposed on a VR headset, which is wearable on a user. When a user wears the VR headset, the HMD device 110 will cover visions of the user, and the HMD device 110 is configured to provide virtual reality visions to the user. In some embodiments, the tracking devices 130A and 130B are self-tracking devices, which are held by the user and may be controlled by the user.

In some embodiments, the HMD device 110 works as a host device, and the tracking devices 130A and 130B works as a client device. In some embodiments, the HMD device 110 and the tracking devices 130A and 130B are communicatively connected to each other.

As shown in FIG. 1. The user is operating the virtual reality system 100 in an environment E. In some embodiments, the virtual reality system 100 generates and updates a host map of the environment E according to the features of the environment E. In some embodiments, the virtual reality system 100 is a SLAM system.

Figure 2:
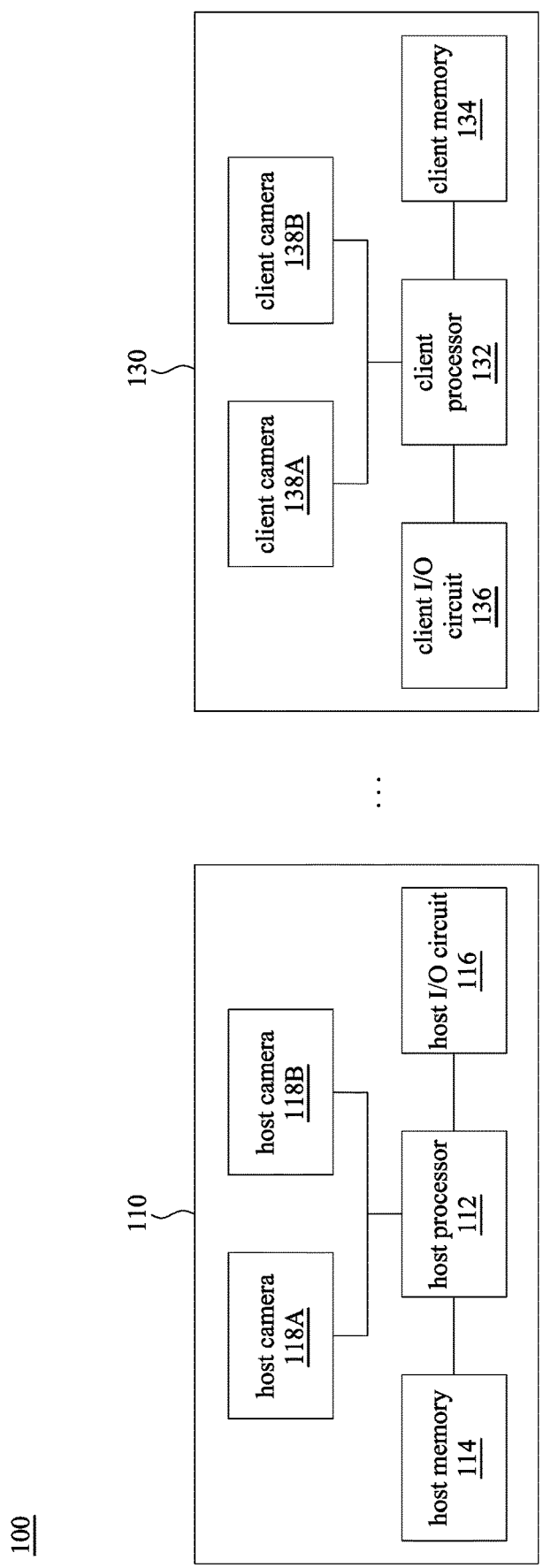
FIG. 2 is a schematic diagram illustrating the virtual reality system as illustrated in FIG. 1 according to some embodiments of the present disclosure.

Reference is made to FIG. 2. FIG. 2 is a schematic diagram illustrating the virtual reality system 100 as illustrated in FIG. 1 according to some embodiments of the present disclosure. As illustrated in FIG. 2, the HMD device 110 includes a host processor 112, a host memory 114, a host I/O circuit 116, a host camera 118A and a host camera 118B. The host memory 114 is coupled to the host processor 112, the host I/O circuit 116 is coupled to the host processor 112, the host camera 118A is coupled to the host processor 112, and the host camera 118B is coupled to the host processor 112.

The tracking device 130 as illustrated in FIG. 2 represents the tracking devices 130A and 130B as illustrated in FIG. 1.

As illustrated in FIG. 2, the tracking device 130 includes a client processor 132, a client memory 134, a client I/O circuit 136, a client camera 138A and a client camera 138B. The client memory 134 is coupled to the client processor 132, the client I/O circuit 136 is coupled to the client processor 132, the client camera 138A is coupled to the client processor 132, and the client camera 138B is coupled to the client processor 132.

In some embodiments, the HMD device 110 sends or receives information/data or signals through the host I/O circuit 116, and the tracking devices 130A and 130B send or receive information/data or signals through the client I/O circuit 136.

The operation method of the virtual reality system 100 as illustrated in FIG. 1 and FIG. 2 will be explained with reference to FIG. 3 in the following paragraphs.

Figure 3:
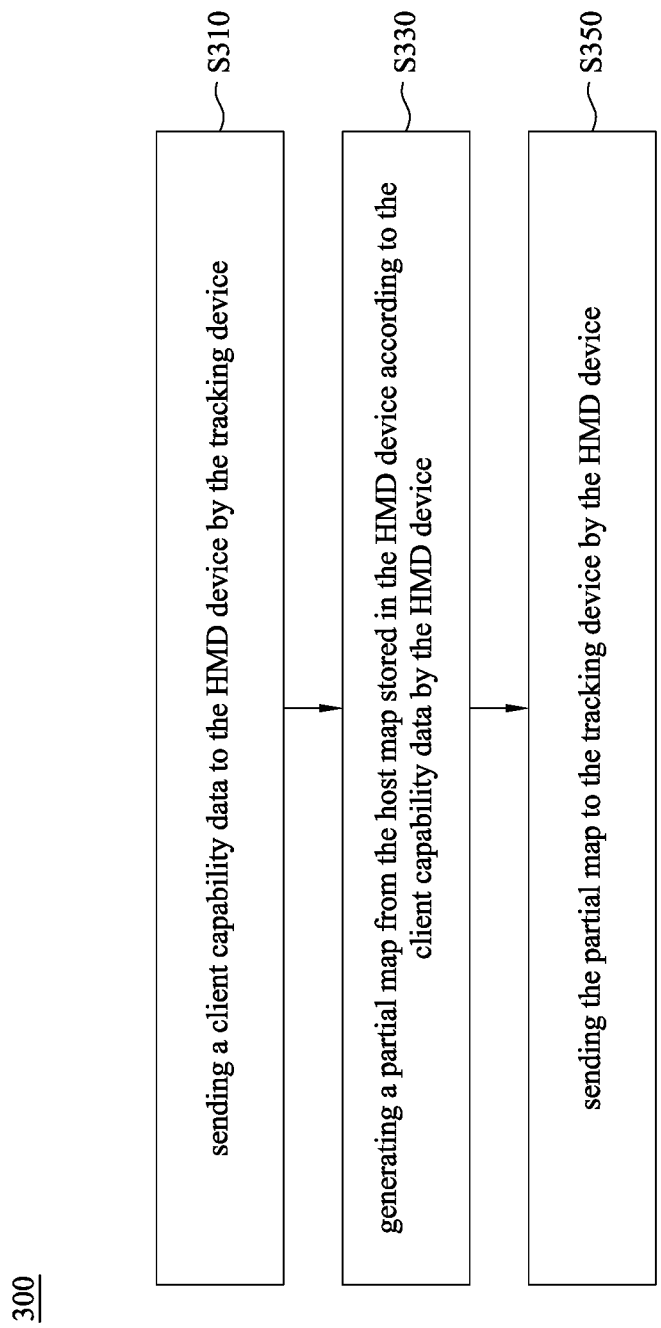
FIG. 3 is a flow chart diagram illustrating a data aligning method according to some embodiments of the present disclosure.

Reference is made to FIG. 3. FIG. 3 is a flow chart diagram illustrating a data aligning method 300 according to some embodiments of the present disclosure. The data aligning method 300 is suitable to be executed by the virtual reality system 100 in FIG. 1 and FIG. 2. The data aligning method 300 includes operations S310 to S350.

In some embodiments, the data aligning method 300 is operated in an initial stage when the user starts to use the virtual reality system 100.

In operation S310, a client capability data is sent to the HMD device by the tracking device. In some embodiments, operation S310 is operated by the host processor 112 of the HMD device 110 as illustrated in FIG. 2.

Reference is made to FIG. 1 and FIG. 2 at the same time. In some embodiments, in an initial stage of the virtual reality system 100, the host memory 114 of the HMD device 110 stores a host map of the environment E.

In some embodiments, the client processor 132 of the tracking device 130A sends the client capability data of the tracking device 130A to the HMD device 110, and the tracking device 130B sends the client capability data of the tracking device 130B to the HMD device 110.

In operation S330, a partial map is generated from the host map stored in the HMD device according to the client capability data by the HMD device. In some embodiments, operation S330 is operated by the host processor 112 of the HMD device 110 as illustrated in FIG. 2.

Reference is made to FIG. 1 and FIG. 2 at the same time. In some embodiments, the client capability data is a client base line value of the tracking device 130, and the partial map is generated according to a ratio between a host base line value of the HMD device 110 and the client base line value.

In some embodiments, the client base line value is the distance between the client camera 138A and the client camera 138B. The host base line value is the distance between the host camera 118A and the host camera 118B. In some embodiments, the host base line value is 15 centimeters to 25 centimeters, and the client base line value is 7.5 meters to 12.5 meters. The client base line value and the host base line value as illustrated above are for illustrative purposes only and the embodiments of the present disclosure are not limited thereto.

In some embodiments, a ratio between the region of the partial map and the region of the host map is in proportional to a ratio between the cube of the client base line value and the cube of the host base line value.

For example, if the client base line value is ½ of the host base line value, the ratio between the cube of the client base line value and the cube of the host base line value is ⅛, and the ratio between the region of the partial map and the region of the host map is ⅛. That is, the region of the partial map is ⅛ of the region of the host map.

In some embodiments, the host processor 112 calculates a client effective depth distance of the tracking device 130 according to the client base line value. In some embodiments, the host processor 112 also calculates a host effective depth distance of the HMD device 110 according to the host base line value.

Figure 4:
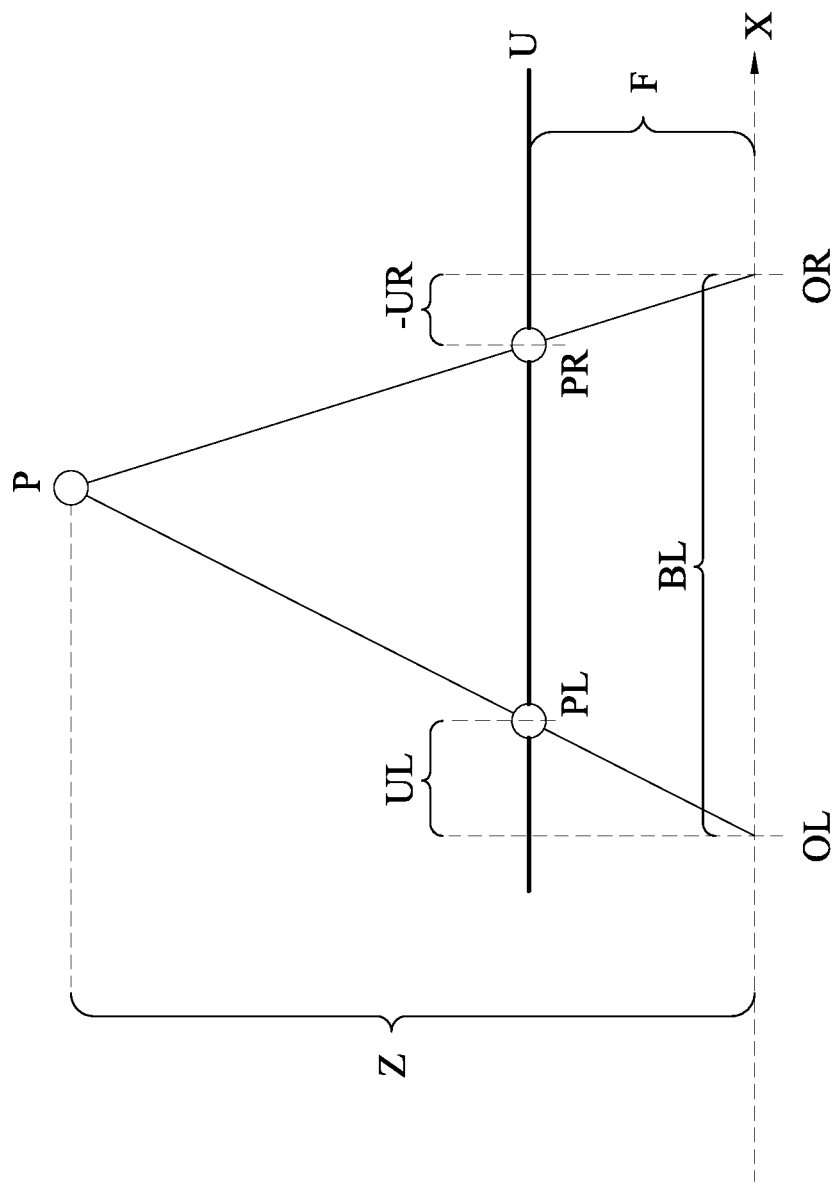
FIG. 4 is a schematic diagram illustrating the calculation of effective depth distance according to some embodiments of the present disclosure.

Reference is made to FIG. 4. FIG. 4 is a schematic diagram illustrating the calculation of the effective depth distance according to some embodiments of the present disclosure. As illustrated in FIG. 4, assume that the client camera 138A and the client camera 138B as illustrated in FIG. 2 are horizontally placed on the X-axis, OL represents the aperture center of the client camera 138A on the X-axis and OR represents the aperture center of the client camera 138B on the X-axis. The distance between the client camera 138A and the client camera 138B is the client base line BL. F represents the focal length. UL represents the coordinate on the imaging plane (not shown) corresponding to the client camera 138A, and UL represents the coordinate on the imaging plane corresponding to the client camera 138B. The point P in the environment E as illustrated in FIG. 1 forms a left image on the imaging plane at position PL and forms a right image on the imaging plane at position PR. Z represents the client effective depth distance.

According to the similarity of the triangles P-PL-PR and P-OL-OR, formula (1) is obtained:

$$\frac{Z-F}{Z} = \frac{BL - UL + UR}{BL}, \qquad \text{formula (1)}.$$

According to formula (1), the client effective depth distance is obtained as formula (2):

$$Z = \frac{F \times BL}{UL - UR}, \qquad \text{formula (2)}.$$

The method of calculating the host effective depth distance according to the host base line value is similar to the method of calculating the client effective depth distance according to the client base line value, and the calculation of the host effective depth distance will not be described in detail here.

In some embodiments, the client capability data includes the client effective depth distance, and the client effective depth distance is sent from the tracking device 130 to the HMD device 110.

In some embodiments, the effective depth distance is in proportional to the base line value. That is, the larger of the base line value, the larger of the effective depth distance. The smaller of the base line value, the smaller of the effective depth distance. The relationship between the effective depth distance and the base line value may also be seen from the formula (2) as mentioned above. That is, the larger of the base line value, the larger of the effective depth distance.

For example, if the client base line value is ½ of the host base line value, the client effective depth distance is ½ of the host effective depth distance.

In some embodiments, the client effective depth distance is 5 meters to 6 meters, and the host effective depth distance is 10 meters to 12 meters. The client effective depth distance and the host effective depth distance as mentioned above are for illustrative purposes only and the embodiments of the present disclosure are not limited thereto.

In some embodiments, the host processor 112 generates the partial map from the host map according to the client effective depth distance.

In some embodiments, the client capability data further includes a default position of the tracking device 130. The default position of the tracking device 130 is sent from the tracking device 130 to the HMD 110, and the partial map is generated from the host map according to the client base line value and the default position.

In some embodiments, when the tracking device 130 is worn on a hand of the user, the default position of the tracking device 130 is 10 centimeters in front of the breast of the user. In some embodiments, when the tracking device 130 is worn on a foot of the user, the default position of the tracking device is 160 centimeters downward the HMD device 110.

Figure 5:
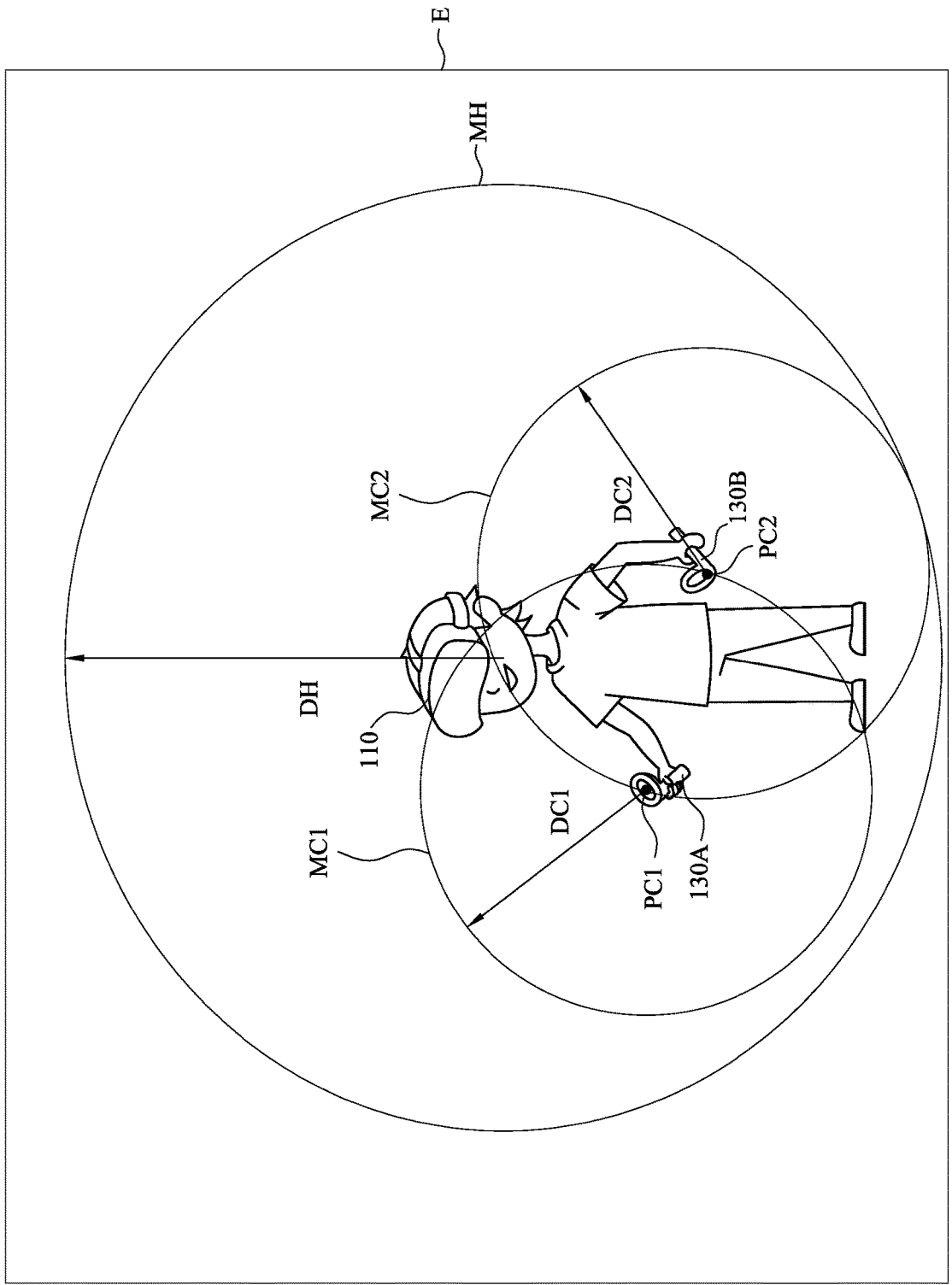
FIG. 5 is a schematic diagram illustrating an example of a partial map according to some embodiments of the present disclosure.

Reference is made to FIG. 5 at the same time. FIG. 5 is a schematic diagram illustrating an example of the partial map according to some embodiments of the present disclosure. As illustrated in FIG. 5, the user is operating the virtual reality system 100 (including the HMD device 110 and the tracking devices 130A and 130B) in the environment E.

As illustrated in FIG. 5, the default position of the tracking device 130A is the default position PC1, and the default position of the tracking device 130B is the default position PC2. The client effective depth distance of the tracking device 130A is the client effective depth distance DC1, and the client effective depth distance of the tracking device 130B is the client effective depth distance DC2. The host effective depth distance of the HMD device 110 is the host effective depth distance MH.

The host processor 112 as illustrated in FIG. 2 generates the partial map PC1 from the host map MH according to the default position PC1 and the client effective depth distance DC1, and the host processor 112 generates the partial map PC2 from the host map HM according to the default position PC2 and the client effective depth distance DC2.

In detail, within the region of the host map MH, the region of the partial map MC1 is generated with the default position PC1 as the circle center and the client effective depth distance DC1 as the radius. Also, within the region of the host map MH, the region of the partial map MC2 is generated with the default position PC2 as the circle center and the client effective depth distance DC2 as the radius. The region of the partial map MC1, the region of the partial map MC2, and the region of the host map MH are 3D regions (3D maps).

Reference is made to FIG. 3 again. In operation S350, the partial map is sent to the tracking device by the HMD device. In some embodiments, operation S350 is operated by the host processor 112 of the HMD device 110 as illustrated in FIG. 2. That is, the host processor 112 of the HMD device 110 sends the partial map to the tracking device 130 as illustrated in FIG. 2.

Reference is made to FIG. 5 at the same time. In some embodiments, the host processor 112 of the HMD device 110 generates and sends the partial map MC1 to the tracking device 130A, and the host processor 112 of the HMD device 110 generates and sends the partial map MC2 to the tracking device 130B.

The embodiments of the present disclosure provide a head-mounted display device, a tracking device, and a data aligning method, by generating the partial map according to the client capability data of the tracking device, the HMD device sends the partial map instead of the host map to the tracking device. In this way, the transmission data from the HMD device to the tracking device is reduced in the initial stage, and the user can get a better user experience.

Reference is made to FIG. 2 again. In some embodiments, the host processor 112 and the client processor 132 can be, but are not limited to being, a single processor or an integration of multiple microprocessors such as CPUs or GPUs. The microprocessors are electrically coupled to the memory to access the at least one instruction. According to the at least one instruction, the above-mentioned data aligning method can be performed. In some embodiments, the memory (the host memory 114 or the client memory 134) can be a flash memory, a HDD, a SSD (Solid State Disk), a DRAM (Dynamic Random Access Memory) or a SRAM (Static Random-Access Memory). In some embodiments, each of the host memory 114 and the client memory 134 can be a non-transitory computer readable medium stored with at least one instruction associated with a data aligning method. The at least one instruction can be accessed and executed by the host processor 112 or the client processor 132.

In addition, it should be noted that in the operations of the above-mentioned data aligning method 300, no particular sequence is required unless otherwise specified. Moreover, the operations may also be performed simultaneously, or the execution times thereof may at least partially overlap.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An HMD (head-mounted display) device, communicatively connected to a tracking device, wherein the HMD device comprises:
a host memory, configured to store a host map; and
a host processor, configured to:
obtain a client capability data from the tracking device;
generate a partial map from the host map according to the client capability data, wherein the partial map is generated within a region of the host map; and
send the partial map to the tracking device.

2. The HMD device of claim 1, wherein the client capability data comprises a client base line value of the tracking device.

3. The HMD device of claim 2, wherein the partial map is generated according to a ratio between a host base line value of the HMD device and the client base line value.

4. The HMD device of claim 2, wherein the client capability data further comprises a default position of the tracking device.

5. The HMD device of claim 4, wherein the partial map is generated according to the client base line value and the default position.

6. The HMD device of claim 1, wherein the client capability data comprises a client effective depth distance of the tracking device.

7. The HMD device of claim 6, wherein the partial map is generated according to the client effective depth distance.

8. A tracking device, communicatively connected to an HMD device, wherein the tracking device comprises:

a client processor, configured to:
  send a client capability data to the HMD device; and
  receive a partial map generated according to the client capability data, wherein the partial map is generated within a region of a host map stored in the HMD device; and
a client memory, configured to store the partial map.

9. The tracking device of claim 8, wherein the client capability data comprises a client base line value of the tracking device.

10. The tracking device of claim 9, wherein the partial map is generated according to a ratio between a host base line value of the HMD device and the client base line value.

11. The tracking device of claim 9, wherein the client capability data further comprises a default position of the tracking device, and the partial map is generated according to the client base line value and the default position.

12. The tracking device of claim 8, wherein the client capability data comprises a client effective depth distance of the tracking device, and the partial map is generated according to the client effective depth distance.

13. A data aligning method, suitable for a virtual reality system comprising an HMD device and a tracking device, wherein the data aligning method comprises:
  sending a client capability data to the HMD device by the tracking device;
  generating a partial map from a host map stored in the HMD device according to the client capability data by the HMD device, wherein the partial map is generated within a region of the host map; and
  sending the partial map to the tracking device by the HMD device.

14. The data aligning method of claim 13, wherein the client capability data comprises a client base line value of the tracking device.

15. The data aligning method of claim 14, wherein the partial map is generated according to a ratio between a host base line value of the HMD device and the client base line value.

16. The data aligning method of claim 14, wherein the client capability data further comprises a default position of the tracking device.

17. The data aligning method of claim 16, wherein the partial map is generated according to the client base line value and the default position.

18. The data aligning method of claim 13, wherein the client capability data comprises a client effective depth distance of the tracking device.

19. The data aligning method of claim 18, wherein the partial map is generated according to the client effective depth distance.

20. The data aligning method of claim 13, wherein the partial map is generated in an initial stage.

* * * * *